Dec. 10, 1963  V. L. R. BEALS, JR., ETAL  3,113,451
AIRCRAFT FLUTTER TESTING DEVICE
Filed May 15, 1959  3 Sheets-Sheet 1
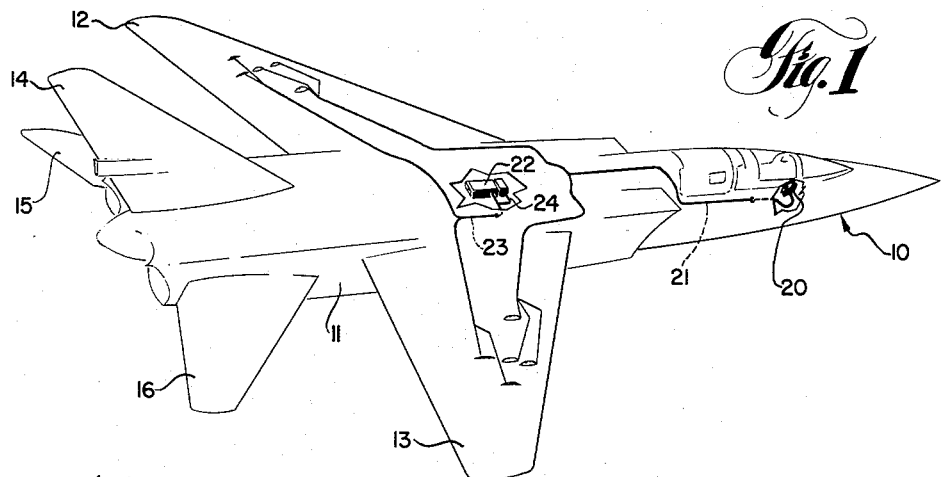
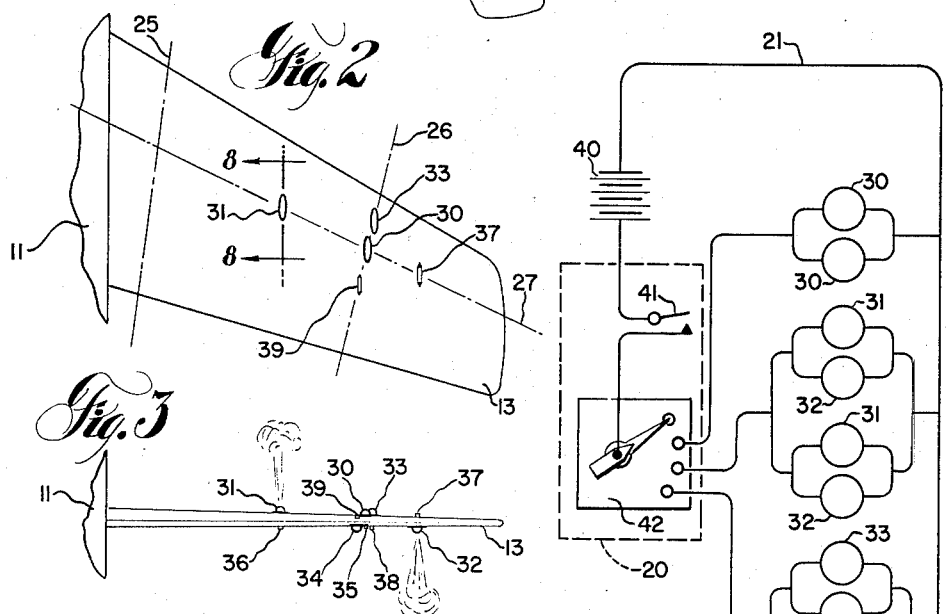
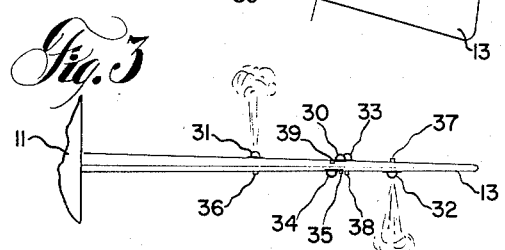
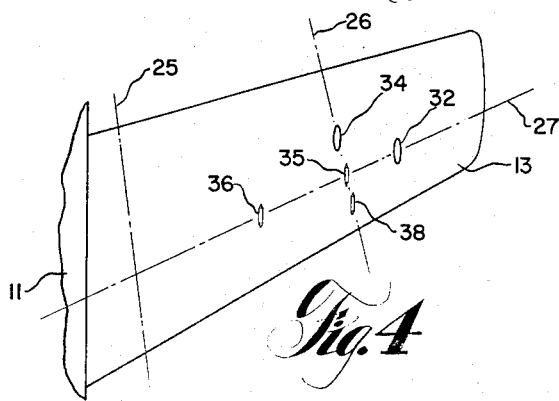
INVENTORS
VAUGHN L. R. BEALS, JR.
STANLEY R. HURLEY
WILLIAM R. LAIDLAW
BY
ATTORNEY

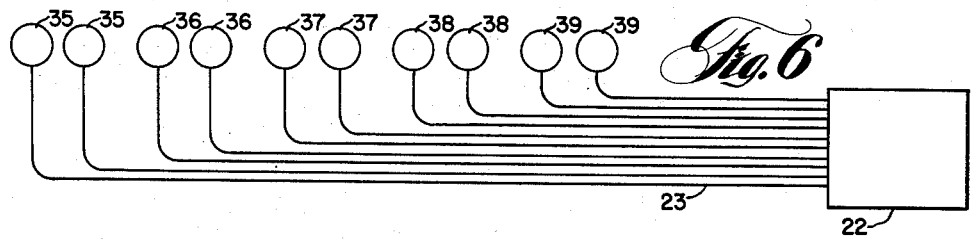
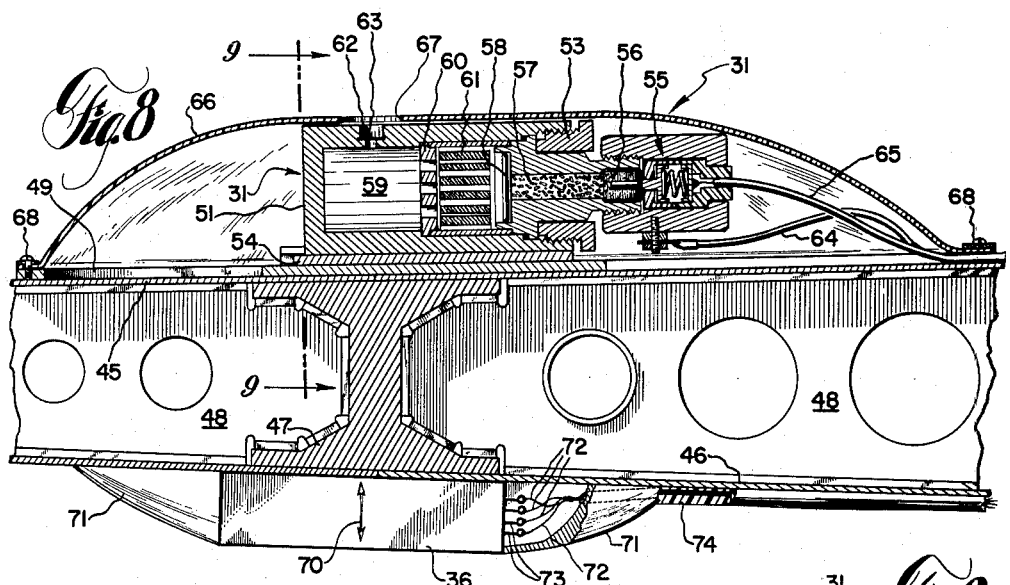

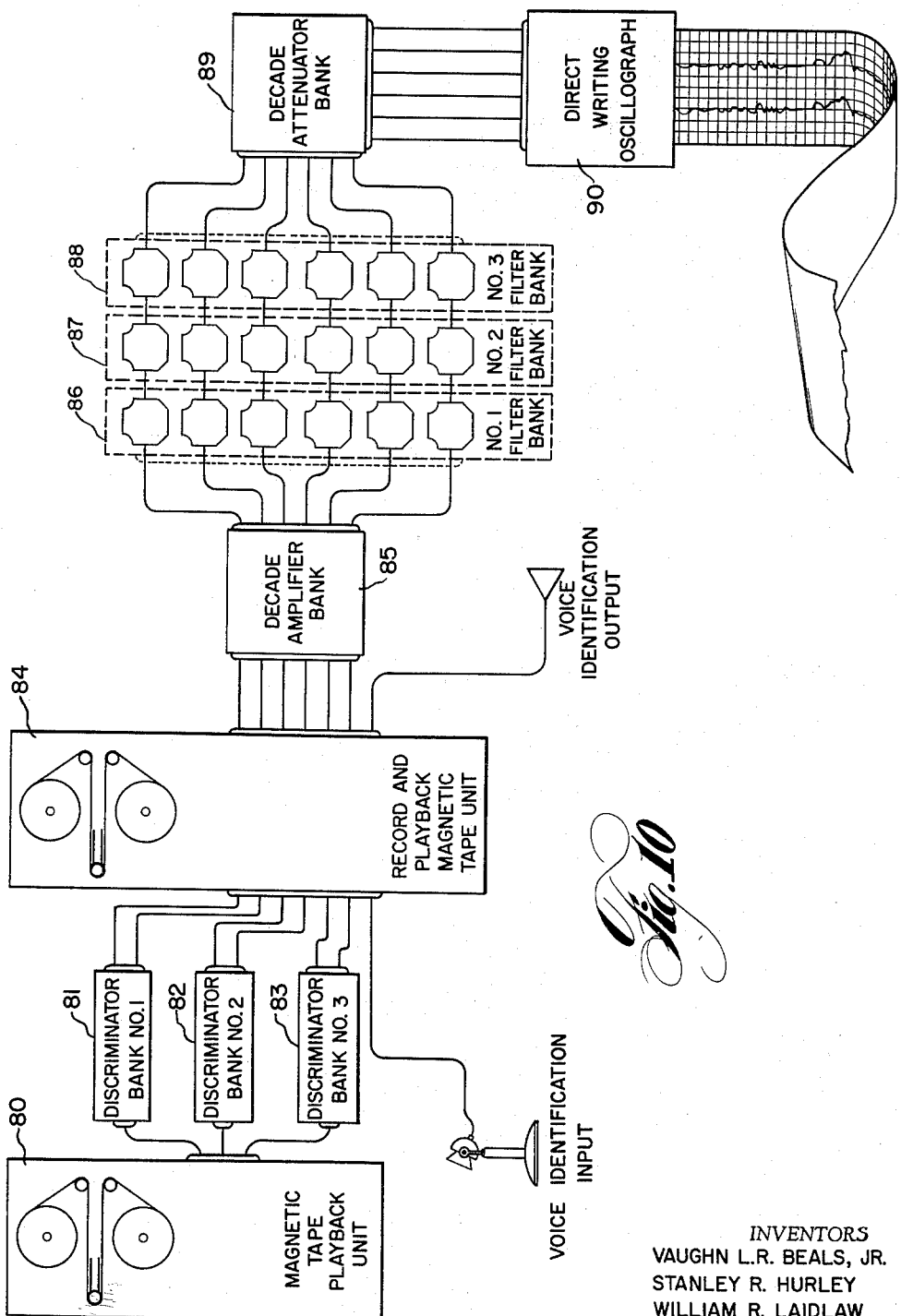

United States Patent Office 3,113,451
Patented Dec. 10, 1963

3,113,451
AIRCRAFT FLUTTER TESTING DEVICE
Vaughn L. R. Beals, Jr., and Stanley R. Hurley, Columbus, and William R. Laidlaw, Westerville, Ohio, assignors to North American Aviation, Inc.
Filed May 15, 1959, Ser. No. 813,478
9 Claims. (Cl. 73—67.2)

This invention relates to aircraft flutter testing, and concerns apparatus for obtaining improved results in connection with the testing of aircraft flight surfaces to determine structural damping charcteristics.

It is an important object of our invention to provide aircraft flutter test apparatus which is particularly effective in connection with in-flight investigation of aircraft flight surface behaviors.

Another object of this invention is to provide an aircraft flutter test equipment arrangement which overcomes the inherent disadvantages associated with the use of known in-flight test equipments having vibration-forcing devices of comparatively greater weight.

Another object of this invention is to provide aircraft flutter test apparatus which obtains important advantages if utilized in connection with in-flight investigation of the vibration damping charcteristics of opposed, symmetrically-arranged aircraft surface members.

A still further object of this invention is to provide aircraft flutter test equipment which is particularly useful in connection with in-flight investigation of structural damping in several low-order vibration modes of an aircraft flight surface.

Another object of our invention is to provide aircraft flutter test equipment that achieves greater purity of vibration response in connection with non-harmonic, transient-type excitation of aircraft structural components.

Another object of this invention is to provide an effective equipment arrangement for non-harmonic aircraft flutter testing wherein all significant vibration modes may be excited with a limited number of vibration-forcing devices of the impulse type.

A still further object of this invention is to provide an in-flight flutter test equipment arrangement for aircraft which is equally effective when used in connection with ground flutter testitng of the aircraft.

Another object of our invention is to provide aircraft flutter testing apparatus which offers considerable economic advantages in comparison with known flutter test apparatus, which may be easily installed and maintained in a test airplane, and which has improved operational reliability through a comparative reduction in construction complexity.

Other objects and advantages of this invention will become apparent during consideration of the detailed description and drawings.

In the drawings:

FIG. 1 is a perspective view of an airplane having the test apparatus of this invention combined therewith;

FIGS. 2, 3, and 4 are plan and elevational views of a portion of the airplane and test equipment arrangement illustrated in FIG. 1;

FIGS. 5 and 6 each schematically illustrate a portion of the test apparatus arrangement shown in FIG. 1;

FIG. 7 is a force-time performance diagram of a preferred type of vibration-forcing device utilized in the practice of our invention;

FIG. 8 is a partial sectional view taken at line 8—8 of FIG. 2;

FIG. 9 is a partial sectional view taken at line 9—9 of FIG. 8; and

FIG. 10 is a schematic illustration of a data reduction equipment arrangement which may be utilized in connection with the apparatus of our invention.

FIG. 1 illustrates an airplane 10 having a fuselage portion 11 and having the flight surfaces referenced by the numerals 12 through 16. Flight surfaces 12 and 13 are conventional wing members, flight surface 14 is illustrated as a typical vertical stabilizer, and surfaces 15 and 16 are shown in the form of components of a horizontal stabilizer. Recent developments in connection with aircraft flutter testing have dictated that suitable apparatus be provided whereby the structural behavior of such aircraft flight surfaces might be effectively investigated during in-flight testing of a particular air vehicle. In consequence thereto, we have invented an improved equipment arrangement and improved testing techniques for use in connection with in-flight evaluation of aircraft such as airplane 10. The apparatus is typically comprised of vibration-forcing devices attached to various flight surfaces, vibration-transducer devices also connected to the flight surfaces under investigation but mounted in generally opposed relation to said vibration-forcing devices, and appropriate control and recording units operationally coupled to the vibration-forcing devices and to the vibration-transducer devices. In FIG. 1, a group of vibration-forcing devices are mounted on flight surfaces 12 and 13 and are operationally coupled to control unit 20 by electrical circuit means 21. In addition, the FIG. 1 equipment arrangement discloses a group of vibration-transducer devices mounted on each of flight surfaces 12 and 13 and operationally coupled to the recording unit 22 by the circuitry designated 23. Supply circuit 24 is employed to power the output signal developed by the transducer devices in response to the vibration detected thereby.

In connection with the flutter evaluation of a flight surface such as 13, it is desired that structural damping information be obtained with respect to several low-order vibration modes. Basically, a non-harmonic forcing function is applied to member 13 and the structural response thereto is studied to deduce modal damping of the first and second bending and the first torsion modes of surface vibration. Referring to FIG. 2, the first bending mode of vibration in wing member 13 occurs generally about the first bending axis 25. The second bending mode in wing member 13 involves vibration about axis 25 and additional bending or vibration generally about second bending axis 26. Another vibration mode typically analyzed in connection with aircraft flight surface flutter evaluation is first torsion; this mode, as related to member 13, involves bending generally about the first torsion axis designated 27. It should be noted that axes 25 through 27 may also be referred to as nodal regions. The following description will be provided primarily with respect to that portion of the test equipment arrangement combined with wing member 13. However, in a typical application a similar installation would be provided in connection with any opposed flight surface, such as wing member 12. Further variations in the basic arrangement will also be hereinafter described.

The vibration-forcing devices provided for exciting or initiating in-flight vibration of wing member 13 are referenced generally by the numerals 30 through 34. Device 30 serves to initiate only first bending about first bending axis 25. Paired forcing devices 31 and 32 are provided on opposed surfaces of wing member 13 to excite the second bending mode of surface member flutter. Device 31 is located adjacent an anti-nodal region intermediate axes 25 and 26 and generally adjacent torsion axis 27. Device 32, located on the underside of wing member 13, is placed in an anti-nodal region intermediate axis 26 and the outboard extreme of wing member 13. Also, it is preferred that device 32 be located generally along the first torsion axis 27. Vibration-forcing devices 33 and 34 are provided for exciting first torsion of wing member 13. Such devices are located at opposed surface portions of wing member 13 but along the region of second bending axis 26. In each instance, device 33 or 34 is positioned substantially intermediate the torsion axis 27 and the wing member leading or trailing edge located to either side thereof.

In addition, the test equipment arrangement of FIG. 1 includes the vibration-transducer devices referenced by the numerals 35 through 38. Such devices may take the form of strain gages, crystal pick-ups, or accelerometers, but they are illustrated in the form of conventional state-of-the-art accelerometers in the drawings. Accelerometer 35 is located at the underside of wing member 13 preferably in opposed relation to forcing device 30, and serves to detect the magnitude and duration of the transient vibration induced in the flight surface by the forcing device 30 when the forcing device is actuated. Accelerometers 36 and 37 are similarly located with respect to forcing devices 31 and 32. Also, the transducer (accelerometer) devices 38 and 39 are located in a like manner with respect to forcing devices 33 and 34. Those portions of circuits 21 and 23 which join the forcing devices with control unit 20 and which couple the vibration-transducer devices to recorder unit 22 are not illustrated in FIGS. 2 through 4.

The control unit and vibration-forcing devices portion of the equipment arrangement of FIG. 1 is schematically illustrated in FIG. 5. Electrical circuitry 21 connects impulse devices 30 through 34, energy source 40, and switch devices 41 and 42. Switch 41 is illustrated as a manually operated, normally open, single-throw switch. Switch 42 is a selector switch having separate terminals for completing an electrical circuit through the various paired impulse vibration-forcing devices. Energy source 40 is schematically illustrated as a conventional battery. However, this source may typically take the form of a portion of an aircraft alternating current electrical power system having rectifier and filter means and having a capacitor discharge across a resistor to establish the required triggering voltage for the vibration-forcing devices.

FIG. 6 schematically illustrates the connection between airborne tape recorder unit 22 and vibration-transducer devices 35 through 39 as obtained through electrical circuitry 23. Recorder 22 is a conventional airborne tape unit and stores the output signals received from each vibration-transducer device in retrievable form. It should be noted that a telemetering arrangement may be employed with, or as an alternate to, recording unit 22. Also, transducer devices 35 through 39 may each typically contain the elements of a bridge circuit, such circuits being powered by the supply circuit referenced generally as 24 in FIG. 1.

On the basis of analytical considerations, we prefer that forcing devices 30 through 34 each be of an impulse type having at least an approximate semi-sinusoidal force-time performance history. The shape of this performance history is illustrated at 43 in FIG. 7 and will be discussed in greater detail hereinafter. Dotted line 44 of FIG. 7 depicts an ultimately desired true semi-sinusoidal performance curve. The use of impulse devices having an approximate semi-sinusoidal force-time performance characteristic assists in obtaining greater response purity in the structure being excited. Details of a vibration-forcing device having the desired operating characteristics are provided in connection with the illustration of unit 31 of FIG. 8. The FIG. 8 forcing unit is an electrically primed, semi-sinusoidal type impulse vibration-forcing device which has been advantageously utilized in connection with vibration excitation of various flight surfaces of a 60,000 pound gross weight airplane having supersonic speed capabilities.

Referring to FIG. 8, wing member 13 includes an upper skin 45 and a lower skin 46 each attached to spar member 47 and rib members 48. Forcing device 31 is mounted to the upper surface of wing 13 through the slide portions of support plate 49 and by means of set screws 50. It is preferred that support plate 49 be attached to upper skin 45 through the use of an organic adhesive such as a polysulfide type bonding materials which has been cured at elevated temperatures. Use of this particular mounting technique eliminates the necessity of modifying or damaging portions of the aircraft structure.

Vibration-forcing device 31 is basically comprised of a body portion 51 and an ignition assembly connected to the body portion through the lock nut referenced as 53. Body portion 51 has a base part 54 attached thereto and cooperates with the slide portions of support plate 49. The ignition assembly includes an electric connector 55, an electrically initiated primer 56 (e.g., lead styphnate), a black powder initiator charge 57, and a thin metallic separation disk 58. Separation disk 58 functions to delay the release of energy from initiator charge 57 to improve the ignition time repeatability of devices 30 through 34. This will materially aid in obtaining simultaneous ignition of each impulse device contained in a particular electric firing circuit having more than one unit. Contained within body portion 51, intermediate interior chamber 59 and the ignition assembly, is propellant trap means 60 and the main propellant charge 61. It is preferred that charge 61 contain several hand-selected and properly oriented, cylindrical single-perforated grains of propellant. A double-based type or composite type propellant (e.g., M–2 or M–6 propellant) is suitable for use in charge 61. Trap means 60 is shown as perforated and is provided to achieve a maximum burning rate of charge 61.

Body 51 is provided with suitable nozzle means 62 whereby gases introduced into chamber portion 59 in response to ignition of main propellant charge 61 are sufficiently restricted to establish the necessary reaction pressures. A thin rupture disk 63 is provided to seal chamber 59 from the atmosphere prior to ignition of unit 31. Leads 64 and 65 comprise a portion of circuit 21 and are electrically connected to connector means 55. A suitable fairing 66 is mounted in surrounding relation to vibration-forcing device 31, and the opening 67 provided therein is aligned with nozzle means 62. Fairing 66 is secured to support plate 49 by fastener means 68 and serves to minimize aerodynamic turbulence otherwise associated with exteriorly mounted forcing devices.

We prefer that vibration-forcing devices 30 through 34 be provided with a substantially identical ignition time as between individual units. Referring to FIG. 7, a typical elapsed time between receipt of an electrical firing impulse at primer 56 and the start of the impulse force developed through nozzle means 62 has a time value $T_1$. This elapsed time value, in the case of vibration-forcing devices such as unit 31, is constant as between individual units and is typically less than 0.001 second. This uniform capability provides excellent results when the simultaneous firing of several impulse devices is required. Vibration-forcing devices 31, in a typical range, have a main propellant charge 61 varying in weight from 1.1 grams to 2.8 grams to establish a maximum impulse force of from 50 pounds to 200 pounds. The duration of the near-semi-sinusoidal portion of a typical force-time performance may vary from as little as 5 to 7 milliseconds to approximately 28 milliseconds. Each forcing device 30 through 34 typically weighs considerably less than one pound and has overall dimensions of approximately 1½″ diameter by 3″ length. The internal pressures developed in chamber portion 59 vary throughout the range of 4,000 to 10,000 p.s.i.

As previously indicated, the vibration induced into the flight surface member by vibration-forcing devices 30 through 34 are detected by the transducer devices 35 through 39. We prefer to use state-of-the-art accelerometers of good quality and having fluid-damped movements. Referring to FIG. 8, accelerometer device 36 is mounted at the underside of skin 46 and is preferably attached thereto through the use of an organic, heat-curable adhesive such as that described in connection with the installation of support plate 49. Transducer 36 is provided with an axis of sensitivity 70 which is customarily clearly embossed or marked on the housing of the unit. As illustrated in the drawings, device 36 is mounted so that its axis of sensitivity 70 is arranged normal to the exterior surface of flight member 13. To minimize aerodynamic turbulence, the fairings designated 71 are attached to skin 46 fore and aft of transducer 36. Such fairings may be fabricated of wood or metal and are preferably attached to the surface by a suitable adhesive. Leads 72 comprise a portion of circuit 23 and circuit 24 and are electrically connected to the contact pins 73 of accelerometer device 36. Mastic 74 is utilized to secure leads 72 and other exteriorly located circuit portions to the surface of flight member 13. It should be noted that we prefer that circuit portions which cannot be conveniently located within the exterior of airplane 10 be positioned exterior to the airplane and secured thereto by the mastic. This installation technique eliminates the necessity of cutting into or otherwise damaging the aircraft.

In a typical aircraft flight test program it is desired that structural damping be investigated in connection with particular flight conditions throughout a substantial range of altitudes and flight velocities. To analyze a particular mode of vibration it is preferred that the pilot select the suitable vibration-initiating circuit through a proper positioning of selector switch 42. The airplane is then put into a particular flight condition and the firing switch 41 is actuated to complete the firing circuit for the mode being investigated.

Referring to the apparatus as provided for investigating second bending, when switch 41 is closed a firing circuit is simultaneously completed through all vibration-forcing devices 31 and 32. The near-semi-sinusoidal force-time histories developed by units 31 through 32 induce transient second bending in flight surface members 12 and 13. Referring to FIGS. 2 through 4, such excitation involves a simultaneous vibration with respect to each of axes 25 and 26. Axes 25 and 26 in effect become nodal regions with anti-nodal conditions being established therebetween and between axis 26 and the outboard extreme of the flight surface. The transient structural damping response developed in flight in consequence to such excitation is detected by vibration-transducer devices 36 and 37 and the modulated output signals are transmitted by circuit means 23 to the recording unit 22 where such information is stored in retrievable form.

The structural damping behavior detected by each of transducer devices 35 through 39 and recorded as data by airborne tape recorder unit 22 is subsequently processed through a data reduction technique in order that the modal damping characteristics of the various vibration-excited flight surfaces might be conveniently obtained by analysis. The equipment arrangement for processing the basic data to a form suitable for analysis is illustrated schematically in FIG. 10. Magnetic tape playback unit 80 is utilized to retrieve the raw data recorded by airborne unit 22. In the arrangement discussed herein, it is assumed that the number of recording channels available in unit 22 is less than the number of transducer devices whose modulated output signals must be recorded simultaneously. Accordingly, the behavior detected by each transducer device is typically recorded in analog form using a separate sub-carrier. Conventional oscillator circuits are provided in combination with unit 22 to develop the sub-carrier frequencies carried by a single-tape track.

The equipment arrangement of FIG. 10 also includes discriminator banks 81, 82, and 83 for separating the individual subcarriers of a particular tape track and for demodulating the basic data signal carried by each sub-carrier. In the illustrated arrangement, each discriminator bank simultaneously develops the modulated signals carried by two sub-carriers. The output signals of discriminator banks 81 through 83 are subsequently recorded in retrievable form at the tape recorder portion of record and playback magnetic tape unit 84. This unit is illustrated as having seven separate channels; six channels of unit 84 are utilized for parameter information received from discriminator banks 81 through 83, and one channel is used for voice identification information.

The discriminated information sourced by an individual transducer device is subsequently processed through decade amplifier bank 85, through one or more of filter banks 86, 87, and 88, through decade attenuator bank 89, and into the direct-writing oscillograph referenced as 90. Filter banks 86 through 88 may be each composed of six variable band-pass filters, each of which has an infinitely variable band-pass capability between .02 and 2000 cycles per second.

Referring to a single-channel from unit 84 to oscillograph 90, the discriminated parameter information is first passed through decade amplifier 85 to establish a usable output signal. When the vibration mode being analyzed is comparatively widely separated frequency-wise from other vibration modes present in the tested structure, one band-pass filter (e.g., the band-pass elements of filter bank 86) may be entirely adequate to produce a reliable oscillographic recording. If required, the particular firing under consideration may be subsequently re-played using a filter setting of narrower band-pass width. In connection with the analysis of such recorded modal damping information, we have utilized a band-pass filter of ten cycles per second width and centered about the theoretically expected modal frequency. A more accurate frequency determination was afterwards established using a three cycle per second band-pass filter centered about the analytically suggested frequency.

However, if the mode under investigation is relatively near in frequency to other vibration modes of the tested flight surface, a series of band-pass filter units will prove effective for establishing a reliable output trace. In connection with previous analysis efforts, we have utilized a series of up to three (3) elements on a particular channel, having the band-pass width of ten cycles per second, six cycles per second, and three cycles per second, respectively. In order to assure that radical frequency shifts have not occurred between successive flight conditions, successive re-plays of information through the filter bank arrangement may be desirable. Such re-plays additionally involve an incremental change in band-pass center frequency while maintaining constant band-widths.

We prefer that theoretical response analyses be prepared in anticipation of the actual flight conditions to be investigated. Such flutter analyses will at least theoretically ascertain the expected modal damping characteristics for the flight surface member under consideration. Any discrepancies which might exist between the theoretical response and the actually obtained in-flight response should be resolved prior to proceeding further with the aircraft flight test program. Flutter tests are preferably carried to within about ten percent of the expected flutter boundary, or to the limit speed envelope of the airplane, whichever occurs first.

In each particular phase of an in-flight flutter test program, it is desired to excite the natural vibration modes of the tested aircraft structure in a manner whereby a maximum response in the desired mode is obtained and a minimum response in all other modes is realized. We have determined that attention must be given to two primary parameters of the vibration-forcing device. One such parameter relates to shape of the force-time history; the other parameter relates to the duration of the force-time history. From FIG. 7 it may be noted that the preferred force-time history is symmetrical with respect to the peak thrust established by the unit, save for the non-symmetric, slight burn-out trail which occurs at the end of the illustrated shape.

The preferred time duration for each generated force-time shape may be established as a function of the ratio of the vibration frequency to be suppressed to the vibration frequency to be analyzed. In a typical vibration-forcing unit we find that the period of the impulse may vary from approximately 1.4 to approximately 1.6 times the half-period of the highest vibration frequency being studied. Time durations below the preferred range tend to provide a reduction of response in the desired mode and further attenuate the response of undesired lower-order modes which might be present. A shift of the forcing function duration to a value greater than the prescribed range also produces undesirable response characteristics. In the case of a square-wave excitation there is a substantial lack of high-frequency attenuation. We define the period of a force-time history as the time intercept established between the force-time history curve points corresponding to ten percent of the maximum developed thrust.

It is to be understood that the forms of the invention herein shown and described are to be taken as preferred embodiments of the same, but that various changes in the shape, size, and selection of parts may be resorted to without departing from the spirit of the invention or the scope of the subjoined claims.

We claim:
1. Test apparatus for use with an aircraft flight surface to induce and measure first bending of said flight surface about a first bending axis, and comprising: an electrically primed impulse forcing device, fastener means securing said forcing device to said flight surface adjacent a first bending anti-nodal region located intermediate said first bending axis and an outboard extreme of said flight surface, electrical priming means connected to said forcing device, and transducer means secured to said flight surface in opposed relation to said forcing device, said forcing device having substantially a semi-sinusoidal force-time performance history when electrically primed.

2. The apparatus defined in claim 1, wherein said forcing device is located at an intermediate position with respect to the leading edge and the trailing edge of said flight surface, said intermediate position being adjacent the first torsion axis of said flight surface.

3. Test apparatus for use with an aircraft flight member having opposed skin means to induce and measure vibration of said flight member about a first bending axis and about a second bending axis, and comprising: an electrically primed impulse forcing device located on each opposed skin means of said flight member, fastener means securing one of said forcing devices to said flight member at a bending anti-nodal region located intermediate said first and second bending axes, separate fastener means securing the other of said forcing devices to said flight member at a bending anti-nodal region located intermediate said second bending axis and an outboard extreme of said flight member, electrical priming means connected to each of said forcing devices, and vibration-transducer means secured to said flight member skin means in opposed relation to said forcing devices, said forcing devices each having an approximate semi-sinusoidal force-time shape when electrically primed.

4. The test apparatus defined in claim 3, wherein said forcing devices are located at intermediate positions with respect to the leading edge and the trailing edge of said flight member, said intermediate positions being along the first torsion axis of said flight member.

5. Test apparatus for use with an aircraft flight surface to induce and measure first torsion of said flight surface about a first torsion axis, and comprising: an electrically primed impulse forcing device, fastener means securing said forcing device to said flight surface adjacent an anti-nodal region located intermediate said first torsion axis and an edge extreme of said flight surface, electrical priming means connected to said forcing device, and vibration-transducer means secured to said flight surface in opposed relation to said impulse-forcing device, said forcing device having a semi-sinusoidal force-time performance history when electrically primed, and said vibration-transducer means being located in an anti-nodal region located intermediate said first torsion axis and an edge extreme of said flight surface.

6. Test apparatus for use with an aircraft flight member having opposed skin means to induce and measure vibration of said flight member about a first torsion axis, and comprising: an electrically primed impulse forcing device located on each opposed skin means of said flight member, fastener means securing one of said forcing devices to said flight member at an anti-nodal region located intermediate said first torsion axis and the leading edge of said flight member, separate fastener means securing the other of said forcing devices to said flight member in an anti-nodal region located intermediate said first torsion axis and the trailing edge of said flight member, electrical priming means connected to each of said forcing devices, and vibration-transducer means secured to said flight member in generally opposed relation to said forcing devices, said forcing devices each having a force-time performance history of approximate semi-sinusoidal shape when electrically primed.

7. Apparatus for use in flight testing an airplane flight surface having exterior opposed skin means; accelerometer devices attached to said flight surface to detect vibration, and vibration-inducing means connected to said flight surface in opposed relation to said accelerometer devices to establish transient vibration therein, said vibrating-inducing means comprising semi-sinusoidal performance impulse means mounted on said skin means of said flight surface, and ignition means connected to said semi-sinusoidal performance impulse means, said impulse means being located at an anti-nodal vibration region of said flight surface.

8. The combination defined in claim 7, wherein said vibration-inducing means comprises two semi-sinusoidal performance impulse means for inducing second bending, each of said two impulse means being located at a different second bending anti-nodal region of said flight surface and on an opposite skin means with respect to each other to induce second bending, and each of said impulse means having a substantially identical ignition time.

9. The combination defined in claim 7, wherein said vibration-inducing means includes two semi-sinusoidal performance impulse means for inducing first torsion, each of said two impulse means being located at a second bending nodal region, at a different first torsion anti-nodal region, and on an opposite skin means of said flight surface with respect to each other to induce first torsion, and each of said two impulse means having a near-identical ignition time so as to generate simultaneous impulse reaction forces when activated by said ignition means.

References Cited in the file of this patent
UNITED STATES PATENTS

| | | |
|---|---|---|
| 2,151,584 | Bugatti | Mar. 21, 1939 |
| 2,305,268 | Minor et al. | Dec. 15, 1942 |
| 2,362,467 | Clark | Nov. 14, 1944 |
| 2,635,746 | Gordon | Apr. 21, 1953 |
| 2,761,309 | Pearson et al. | Sept. 4, 1956 |

OTHER REFERENCES

Periodical: Electronics, March 1949 issue, pages 86–91, article by Willson.